United States Patent
Suzuki (10) Patent No.: US 8,493,463 B2
(45) Date of Patent: Jul. 23, 2013

(54) SPECTRAL CHARACTERISTIC CORRECTION APPARATUS, SPECTRAL CHARACTERISTIC CORRECTION METHOD AND RECORDING MEDIUM ON WHICH SPECTRAL CHARACTERISTIC CORRECTION PROGRAM IS RECORDED

(75) Inventor: Hiroshi Suzuki, Hachioji (JP)

(73) Assignee: Olympus Corporation, Tokyo (JP)

( * ) Notice: Subject to any disclaimer, the term of this patent is extended or adjusted under 35 U.S.C. 154(b) by 581 days.

(21) Appl. No.: 12/760,624

(22) Filed: Apr. 15, 2010

(65) Prior Publication Data

US 2010/0201839 A1  Aug. 12, 2010

Related U.S. Application Data (63) Continuation of application No. PCT/JP2008/066673, filed on Sep. 16, 2008.

(30) Foreign Application Priority Data

Oct. 19, 2007  (JP) .................................. 2007-272951

(51) Int. Cl.
| | |
|---|---|
| H04N 5/228 | (2006.01) |
| H04N 3/14 | (2006.01) |
| H04N 5/335 | (2011.01) |
| H04N 9/04 | (2006.01) |

(52) U.S. Cl.
USPC ...................................... 348/222.1; 348/273

(58) Field of Classification Search
USPC ..................................................... 348/222.1
See application file for complete search history.

(56) References Cited

U.S. PATENT DOCUMENTS

| | | | | |
|---|---|---|---|---|
| 7,889,250 | B2 * | 2/2011 | Aragaki ......................... | 348/254 |
| 7,999,978 | B2 * | 8/2011 | Nakamura et al. ............ | 358/518 |
| 2005/0018226 | A1 * | 1/2005 | Chiba ............................ | 358/1.9 |
| 2005/0046883 | A1 * | 3/2005 | Chiba ............................ | 358/1.9 |
| 2006/0092441 | A1 * | 5/2006 | Quan et al. .................... | 358/1.9 |
| 2006/0170942 | A1 * | 8/2006 | Chiba ............................ | 358/1.9 |
| 2006/0204084 | A1 * | 9/2006 | Matsuura ....................... | 382/162 |
| 2007/0165282 | A1 * | 7/2007 | Sambongi et al. ........... | 358/3.21 |

FOREIGN PATENT DOCUMENTS

| | | |
|---|---|---|
| JP | 2001-358960 A | 12/2001 |
| JP | 2003-134536 A | 5/2003 |
| JP | 2005-117524 A | 4/2005 |
| JP | 2005-303704 A | 10/2005 |
| JP | 2006-211369 A | 8/2006 |

OTHER PUBLICATIONS

Extended European Search Report (EESR) dated Dec. 5, 2012 (in English) issued in counterpart European Application No. 08838577.8.

* cited by examiner

*Primary Examiner* — Sinh Tran
*Assistant Examiner* — Christopher K Peterson
(74) *Attorney, Agent, or Firm* — Holtz, Holtz, Goodman & Chick, PC (57) ABSTRACT

A spectral characteristic correction apparatus correcting a spectral characteristic characterizing a color signal including a plurality of chrominance signals includes: a correction coefficient calculating unit calculating, on the basis of a basic color signal corresponding to each of a plurality of basic colors calculated from a color signal obtained by photographing a plurality of color patches, for example, and on a predetermined reference color signal corresponding to the basic color signal, a correction coefficient for performing correction for approximating the basic color signal to the reference color signal; and a spectral characteristic correcting unit correcting a spectral characteristic characterizing the basic color signal by using the correction coefficient calculated by the correction coefficient calculating unit.

12 Claims, 6 Drawing Sheets

| R | G | R | G | R |
|---|---|---|---|---|
| G | B | G | B | G |
| R | G | R | G | R |
| G | B | G | B | G |
| R | G | R | G | R |

SPECTRAL CHARACTERISTIC CORRECTION APPARATUS, SPECTRAL CHARACTERISTIC CORRECTION METHOD AND RECORDING MEDIUM ON WHICH SPECTRAL CHARACTERISTIC CORRECTION PROGRAM IS RECORDED

CROSS REFERENCE TO RELATED APPLICATION

This application is a continuation application of PCT/JP2008/066673 filed on Sep. 16, 2008 and claims the benefit of Japanese Application No. 2007-272951 filed in Japan on Oct. 19, 2007, the entire contents of which are incorporated herein by this reference.

BACKGROUND OF THE INVENTION

1. Field of the Invention

The present invention relates to a spectral characteristic correction apparatus, a spectral characteristic correction method, and a recording medium on which spectral characteristic correction program is recorded for correcting spectral characteristics characterizing a color signal including multiple chrominance signals.

2. Description of the Related Art

It is known that color reproduction of a subject shot by an image pickup apparatus such as a digital camera in different environments can vary between the environments. In reality, color reproduction also can vary even when the same subject is shot in the same environment.

Image pickup apparatuses are designed to pick up images by using an image pickup device equipped with a color filter, for example. Different types of image pickup devices have different characteristics, such as spectral characteristics, related to color reproduction. Characteristics of image pickup devices of the same type also can vary depending on materials and manufacturing processes of the image pickup devices or can change with time. The differences in characteristics result in color reproductions that vary from one image pickup apparatuses to another. Color reproduction is treated as one of important factors especially in medical fields. Differences in color production can inhibit medical diagnosis.

To solve the problem, various color correction techniques have been developed. For example, a technique that uses a fixed color correction coefficient that is independent of individual image pickup apparatuses to perform color correction has been proposed. Also, a technique that adaptively derives a color correction coefficient for each individual image pickup apparatus has been proposed.

To address this, for example Japanese Patent Application Laid-Open Publication No. 2001-358960 describes a technique that derives, on the basis of first and second spectral sensitivity distribution, a color correction coefficient for linearly converting a signal characterized by the first spectral sensitivity distribution to a signal characterized by the second spectral sensitivity distribution.

Japanese Patent Application Laid-Open Publication No. 2005-117524 describes a technique in which a color chart is photographed for each of multiple image pickup devices and a color correction coefficient is derived such that image data of the photographed color charts agree with each other.

With the technique described in Japanese Patent Application Laid-Open Publication No. 2001-358960, an optimum color correction coefficient that accommodate differences between two spectral sensitivity distributions can be derived since a color correction coefficient is derived on the basis of each spectral sensitivity distribution.

In the technique described in Japanese Patent Application Laid-Open Publication No. 2005-117524, which uses image data of a color chart photographed with an image pickup apparatus to derive a color correction coefficient, the derived color correction coefficient depends on the number of colors on the color chart.

SUMMARY OF THE INVENTION

According to an aspect of the present invention, there is provided a spectral characteristic correction apparatus correcting a spectral characteristic characterizing a color signal including a plurality of chrominance signals, including: a correction coefficient calculating unit calculating, on the basis of basic color signals corresponding to a plurality of basic colors and predetermined reference color signals corresponding to the basic color signals, a correction coefficient for performing correction for approximating the basic color signals to the reference color signals; a spectral characteristic correcting unit correcting a spectral characteristic characterizing the basic color signals by using the correction coefficient calculated by the correction coefficient calculating unit; and a conversion coefficient calculating unit calculating, on the basis of the spectral characteristic corrected by the spectral characteristic correcting unit and the spectral characteristic characterizing the reference color signals, a conversion coefficient for performing conversion for approximating the corrected spectral characteristic to the spectral characteristic characterizing the reference color signals.

According to another aspect of the present invention, there is provided a spectral characteristic correction method for correcting a spectral characteristic characterizing a color signal including a plurality of chrominance signals, including: a correction coefficient calculating step of calculating, on the basis of basic color signals corresponding to a plurality of basic colors and predetermined reference color signals corresponding to the basic color signals, a correction coefficient for performing correction for approximating the basic color signals to the reference color signals; a spectral characteristic correcting step of correcting a spectral characteristic characterizing the basic color signals by using the correction coefficient calculated by the correction coefficient calculating step; and a conversion coefficient calculating step of calculating, on the basis of the spectral characteristic corrected by the spectral characteristic correcting step and the spectral characteristic characterizing the reference color signals, a conversion coefficient for performing conversion for approximating the corrected spectral characteristic to the spectral characteristic characterizing the reference color signals.

According to yet another aspect of the present invention, there is provided a recording medium on which a spectral characteristic correction program for causing a computer to correct a spectral characteristic characterizing a color signal including a plurality of chrominance signals is recorded, the spectral characteristic correction program including: a correction coefficient calculating step of calculating, on the basis of basic color signals corresponding to a plurality of basic colors and predetermined reference color signals corresponding to the basic color signals, a correction coefficient for performing correction for approximating the basic color signals to the reference color signals; a spectral characteristic correcting step of correcting a spectral characteristic characterizing the basic color signals by using the correction coefficient calculated by the correction coefficient calculating step; and a conversion coefficient calculating step of calculating, on the basis of the spectral characteristic corrected by the spectral characteristic correcting step and the spectral characteristic characterizing the reference color signals, a conversion coefficient for performing conversion for approximating the corrected spectral characteristic to the spectral characteristic characterizing the reference color signals.

DETAILED DESCRIPTION OF THE PREFERRED EMBODIMENT(S)

Embodiments of the present invention will be described below with reference to drawings.

First Embodiment

Figure 1:
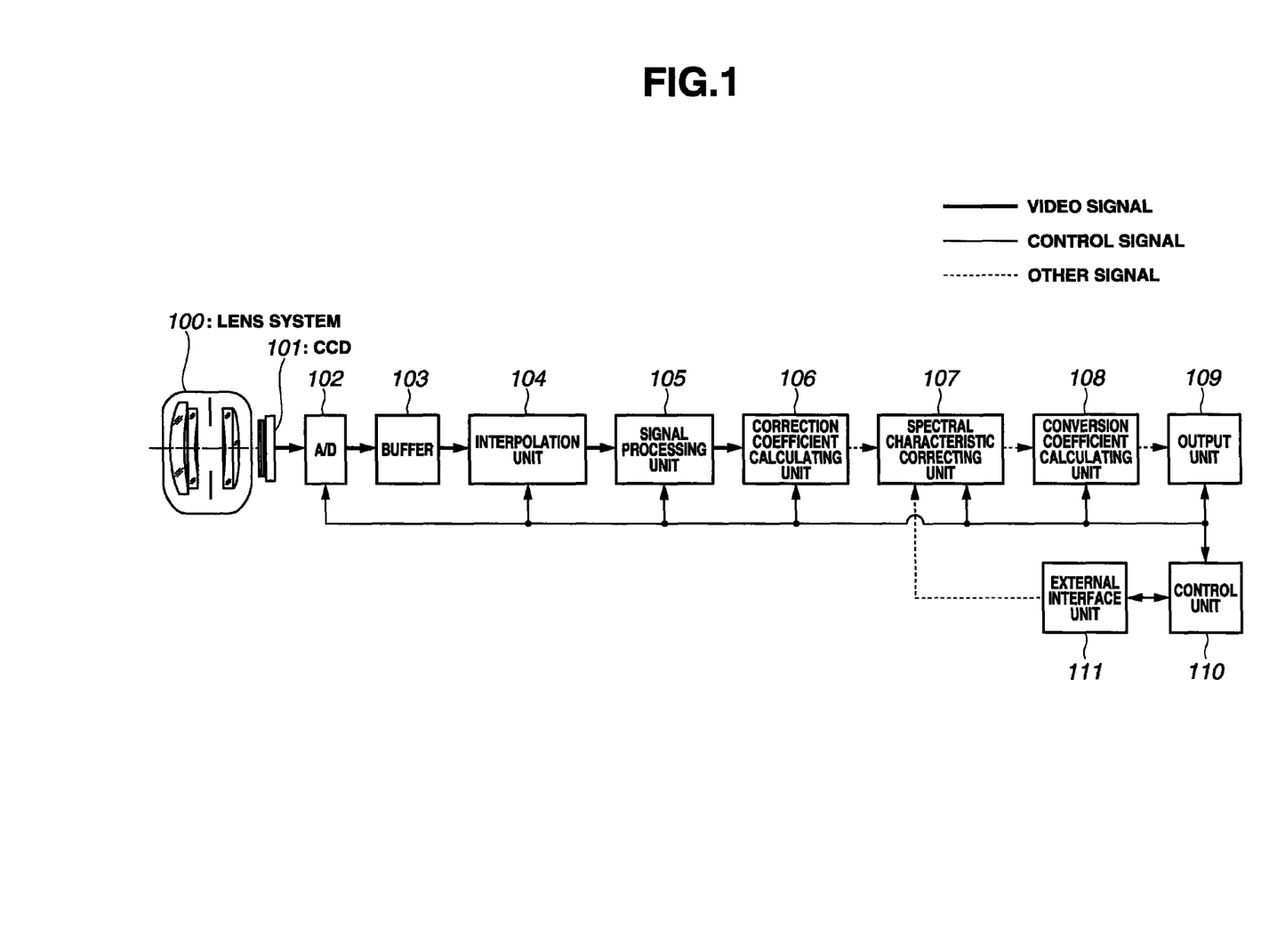
FIG. 1 is a bock diagram illustrating a spectral characteristic correction apparatus having a function of an image pickup apparatus according to a first embodiment of the present invention.
Figure 2:
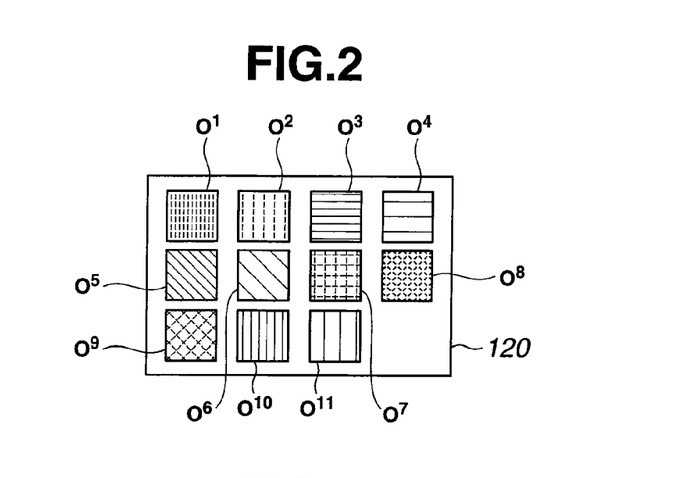
FIG. 2 is a diagram illustrating a color chart in the first embodiment.
Figure 3:
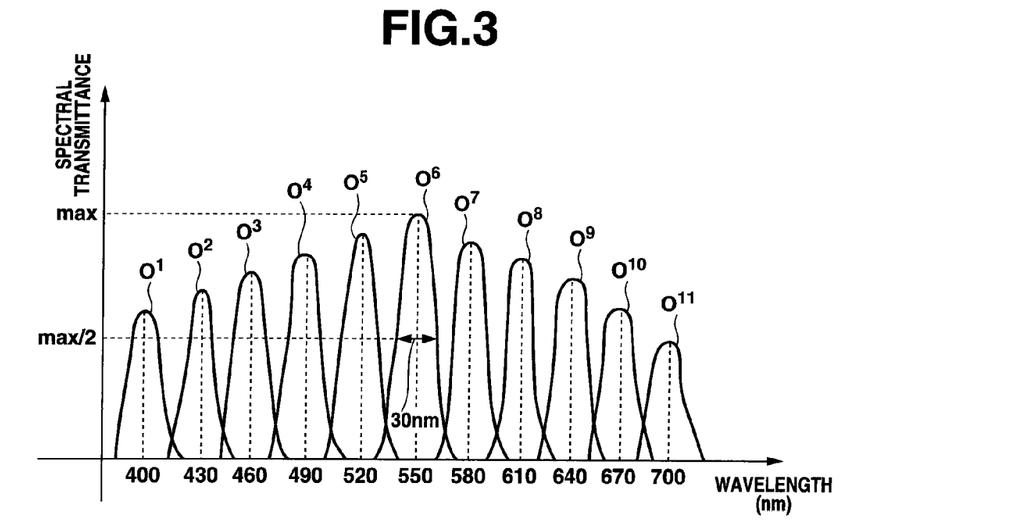
FIG. 3 is a graph illustrating spectral transmittances of color patches of the color chart in the first embodiment.
Figure 4:
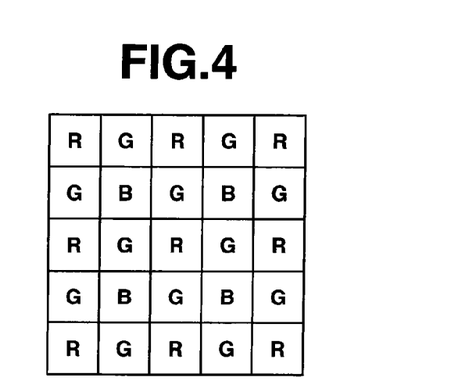
FIG. 4 is a diagram illustrating a configuration of a Bayer primary color filter in the first embodiment.
Figure 5:
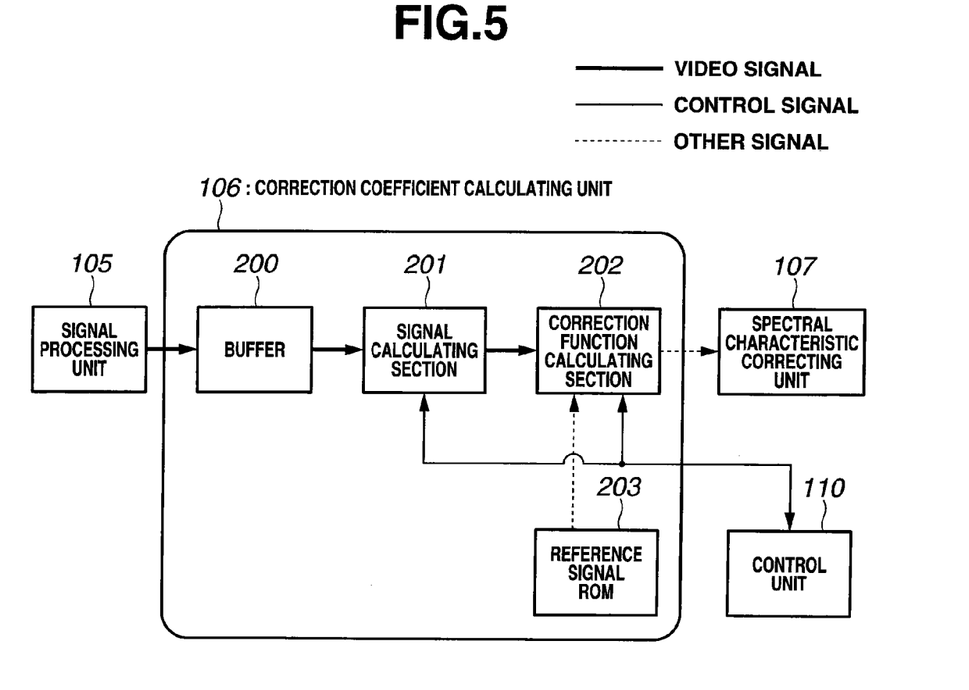
FIG. 5 is a block diagram illustrating a configuration of a correction coefficient calculating unit in the first embodiment.
Figure 6:
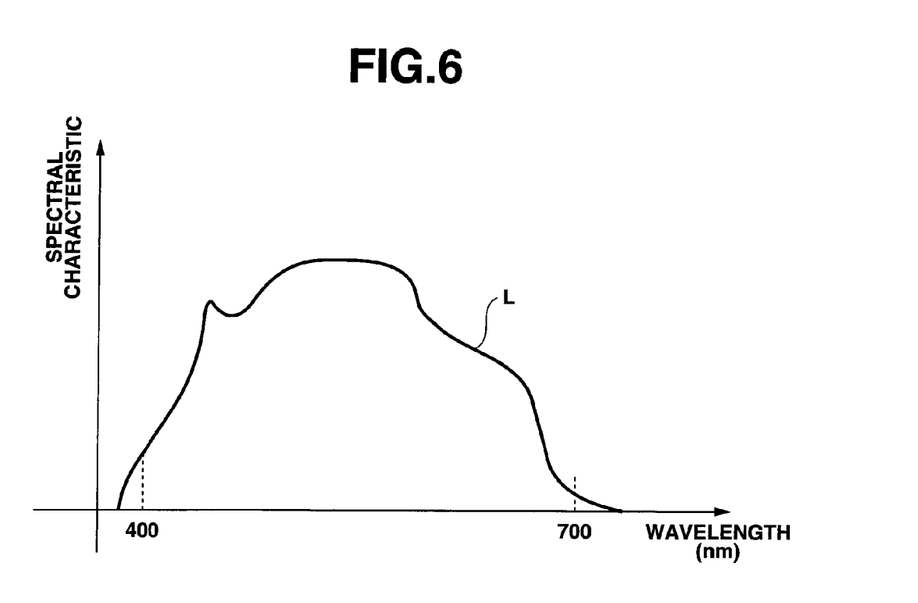
FIG. 6 is a graph illustrating a spectral characteristic of a light source in the first embodiment.
Figure 7:
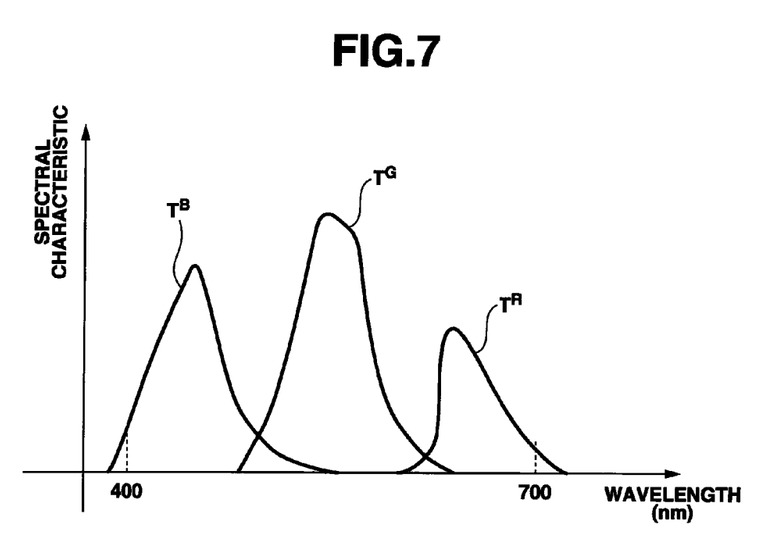
FIG. 7 is a graph illustrating target spectral characteristics representing targeted color reproduction of an image pickup device in the first embodiment.
Figure 8:
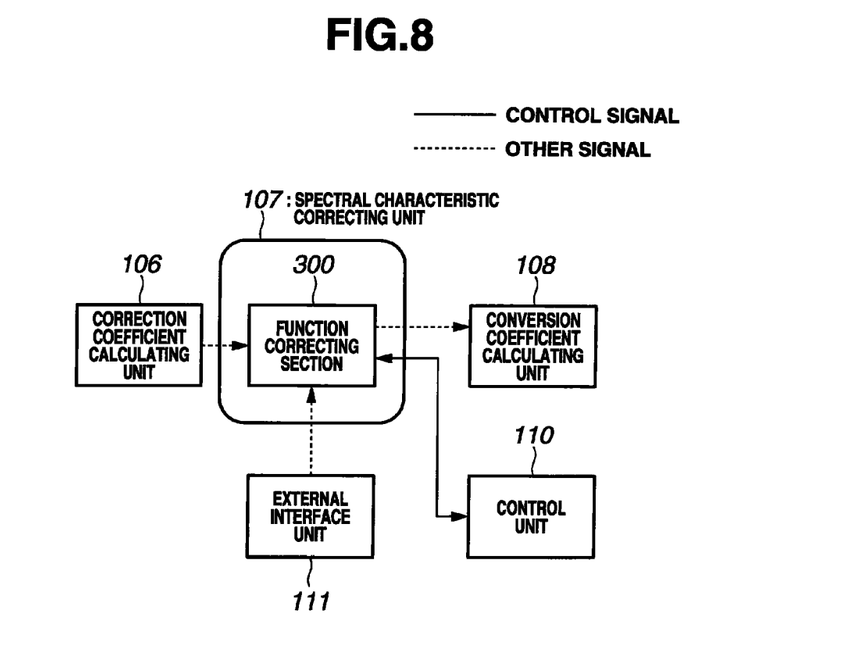
FIG. 8 is a block diagram illustrating a configuration of a spectral characteristic correcting unit in the first embodiment.
Figure 9:
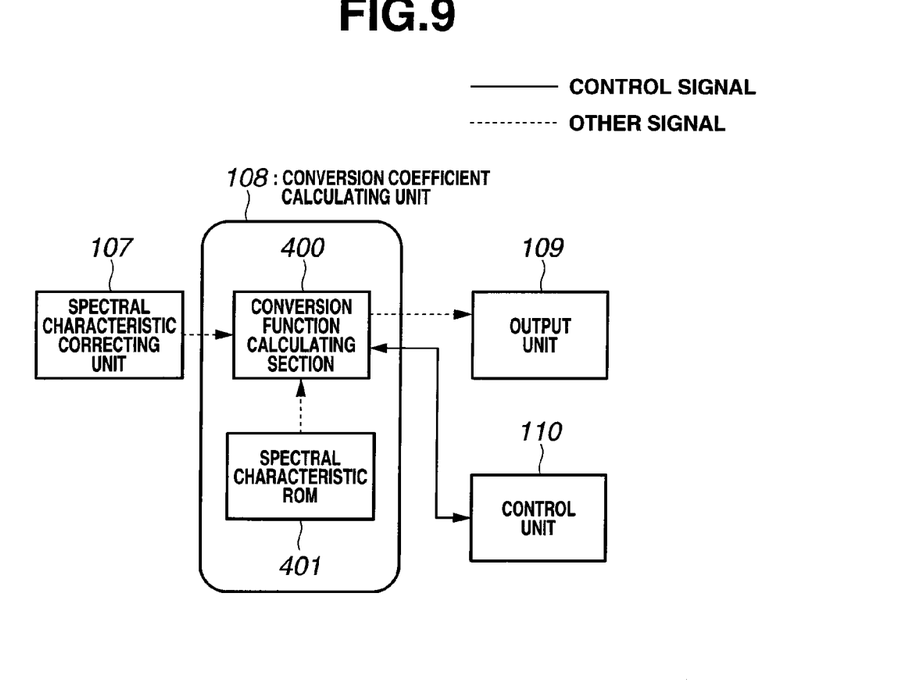
FIG. 9 is a block diagram illustrating a configuration of a conversion coefficient calculating unit in the first embodiment.
Figure 10:
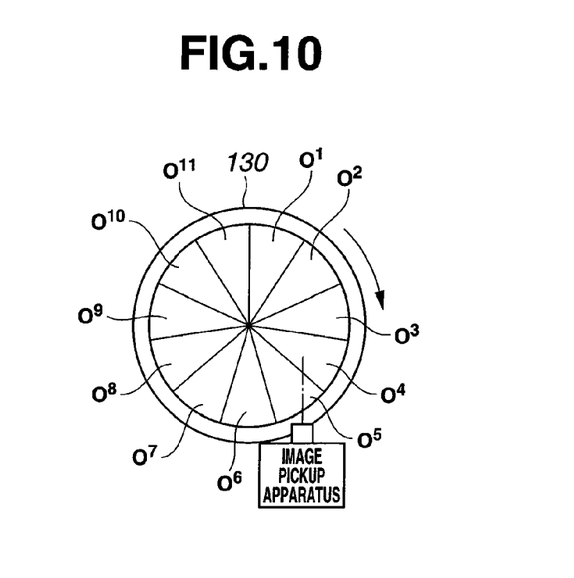
FIG. 10 is a diagram illustrating a configuration of a rotary filter in the first embodiment.
Figure 11:
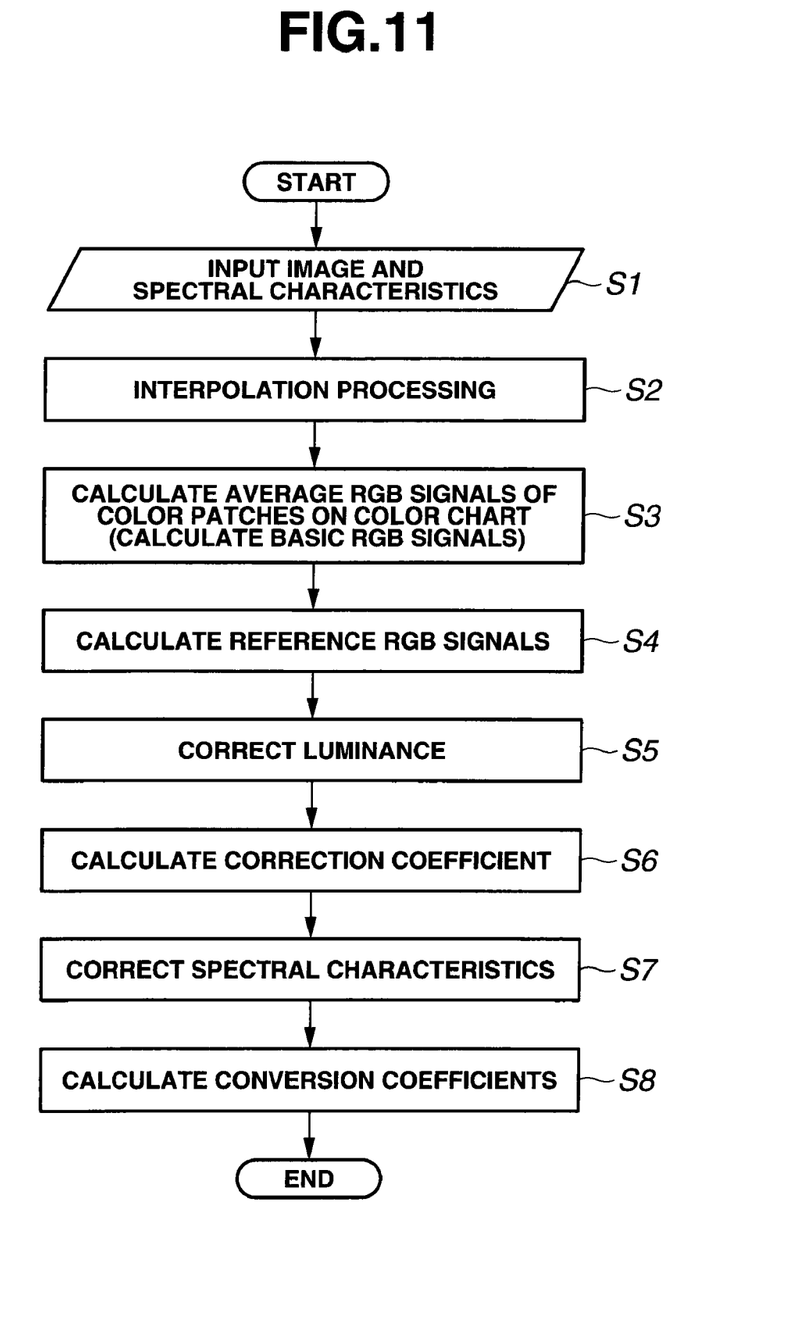
FIG. 11 is a flowchart illustrating a spectral characteristic correction process in the first embodiment.

FIGS. 1 through 11 illustrate a first embodiment of the present invention. FIG. 1 is a block diagram illustrating a configuration of a spectral characteristic correction apparatus having a function of an image pickup apparatus; FIG. 2 is a diagram illustrating a color chart; FIG. 3 is a graph illustrating spectral transmittances of color patches of the color chart; FIG. 4 is a diagram illustrating a configuration of a Bayer primary color filter; FIG. 5 is a block diagram illustrating a configuration of a correction coefficient calculating unit; FIG. 6 is a graph illustrating a spectral characteristic of a light source; FIG. 7 is a graph illustrating target spectral characteristics representing targeted color reproduction of an image pickup device; FIG. 8 is a block diagram illustrating a configuration of a spectral characteristic correcting unit; FIG. 9 is a block diagram illustrating a configuration of a conversion coefficient calculating unit; FIG. 10 is a diagram illustrating a configuration of a rotary filter; and FIG. 11 is a flowchart illustrating a spectral characteristic correction process.

A configuration of a spectral characteristic correction apparatus having a function of an image pickup apparatus will be described first with reference to FIG. 1.

The spectral characteristic correction apparatus includes a lens system 100, a CCD 101, an A/D conversion unit 102, a buffer 103, an interpolation unit 104, a signal processing unit 105, a correction coefficient calculating unit 106, a spectral characteristic correcting unit 107, a conversion coefficient calculating unit 108, an output unit 109, a control unit 110, and an external interface unit 111.

The lens system 100 is designed to form an optical image of a subject on the CCD 101 and constitutes an image pickup unit.

The CCD 101 is an image pickup device which photoelectrically converts an optical image formed through the lens system and outputs a video signal. The CCD 101 constitutes an image pickup unit.

The CCD 101 is connected to the output unit 109 through the A/D conversion unit 102, the buffer 103, the interpolation unit 104, the signal processing unit 105, the correction coefficient calculating unit 106, the spectral characteristic correcting unit 107, and the conversion coefficient calculating unit 108, in this order. The external interface unit 111 is connected to the spectral characteristic correcting unit 107. The control unit 110 is bidirectionally connected to the A/D conversion unit 102, the interpolation unit 104, the signal processing unit 105, the correction coefficient calculating unit 106, the spectral characteristic correcting unit 107, the conversion coefficient calculating unit 108, the output unit 109, and the external interface unit 111.

The A/D conversion unit 102 is designed to convert an analog video signal outputted from the CCD 101 to a digital video signal.

The buffer 103 is designed to temporally store a digital video signal produced through conversion by the A/D conversion unit 102.

The interpolation unit 104 is designed to apply well known interpolation processing, such as interpolation to a three signal including all of three color component signals for each pixel from a single signal including only one of three color component signals for each pixel, to a video signal transferred from the buffer 103.

The signal processing unit 105 is designed to apply well known signal processing such as luminance correction to a video signal transferred from the interpolation unit 104.

The correction coefficient calculating unit 106 is designed to calculate a correction coefficient on the basis of a video signal transferred from the signal processing unit 105, as will be described later.

The spectral characteristic correcting unit 107 is designed to correct a spectral characteristic on the basis of a correction coefficient transferred from the correction coefficient calculating unit 106, as will be described later.

The conversion coefficient calculating unit 108 is designed to calculate a conversion coefficient on the basis of a corrected spectral characteristic transferred from the spectral characteristic correcting unit 107, as will be described later.

The output unit 109 outputs a conversion coefficient transferred from the conversion coefficient calculating unit 108 and records the conversion coefficient on a recording medium such as a memory card.

The control unit 110, which may be formed by a microcomputer, for example, centrally controls the entire spectral characteristic correction apparatus.

The external interface unit 111 is an interface including a power switch, a shutter button, an input device for inputting information concerning a spectral characteristic and other information.

Operations of the spectral characteristic correction apparatus illustrated in FIG. 1 will be described below in accordance with a signal flow.

First, a spectral characteristic of an image pickup device to be corrected (spectral characteristic of interest) is inputted through the input device of the external interface unit 111.

Then, a color chart 120 is placed perpendicularly to an optical axis of the lens system 100 in a position where an image of the color chart 120 can be picked up. The shutter button of the external interface unit 111 is pressed to photograph the color chart 120.

It is assumed here that the color chart 120 is a transmissive color chart on which multiple color patches that transmit only light in a predetermined particular narrow wavelength band are arranged. Since the wavelength band of the spectral transmittances of the color patches is narrowed, feature of the distribution profiles of spectral characteristics of the image pickup device can be extracted with a high degree of precision.

Specifically, 11 color patches having spectral transmittances $O^1$ to $O^{11}$ are arranged on the surface of the color chart 120 as depicted in FIG. 2. The spectral transmittances $O^1$ to $O^{11}$ are depicted in FIG. 3. The spectral characteristics $O^1$ to $O^{11}$ are such that peak wavelengths appear at intervals of 30 nm in the range of wavelengths of 400 nm to 700 nm. It is assumed that the distribution profile of spectral transmittance of each color patch is bell-shaped with a full width at half maximum (FWHM) of 30 nm. The FWHM of the color patches is not limited to 30 nm; color patches with any FWHM may be used.

When the transmissive color chart 120 is photographed, a light-box light source is placed at the rear of the color chart 120 and is caused to emit light. In this way, light is applied from behind the color chart 120 toward the lens system 100 and the CCD 101.

Consequently, an optical image of the color chart 120 is formed on the CCD 101 through the lens system 100. The CCD 101 photoelectrically converts the optical image and outputs a video signal. It is assumed in the present embodiment that the CCD 101 is a single-CCD equipped with a Bayer primary color filter.

Here, 2×2-pixel units are arranged on the Bayer primary color filter as depicted in FIG. 4. In each unit, two G (green) pixels are diagonally placed and one R (red) pixel and one B (blue) pixel are diagonally placed in the remaining two pixels.

A video signal from the CCD 101 is converted to a digital signal by the A/D conversion unit 102 and is temporarily stored in the buffer 103. Accordingly, the video signal stored in the buffer 103 through the A/D conversion unit 102 is an RGB signal (RGB Bayer signal) which provides only one of R, G, and B signals for one pixel. The RGB signal is transferred from the buffer 103 to the interpolation unit 104.

The interpolation unit 104 performs well known interpolation processing to generate a three RGB signal (an RGB signal including all of R, G, and B signals for each pixel). The three RGB signal is transferred from the interpolation unit 104 to the signal processing unit 105.

The signal processing unit 105 applies well known signal processing such as luminance correction to the RGB signal transferred from the interpolation unit 104. The video signal processed by the signal processing unit 105 is transferred to the correction coefficient calculating unit 106.

The correction coefficient calculating unit 106 calculates a correction coefficient used for correcting a spectral characteristic, on the basis of the RGB signal obtained through the signal processing unit 105 and an internally stored, predetermined reference RGB signal for each of the color patches.

The correction coefficient calculated by the correction coefficient calculating unit 106 is transferred to the spectral characteristic correcting unit 107.

The spectral characteristic correcting unit 107 corrects a spectral characteristic of interest (a spectral characteristic to be corrected) on the basis of the correction coefficient calculated by the correction coefficient calculating unit 106. It is assumed here that the spectral characteristic of interest which is inputted through the external interface unit 111 as stated above is a spectral characteristic typical of a model of CCD 101. Specifically, a spectral characteristic stated in a catalog, for example, can be used. The typical spectral characteristic is not limited to one that stated in a catalog. For example, a spectral characteristic of one particular CCD that belongs to a given model may be actually measured and the measured spectral characteristic may be used. The spectral characteristic of interest corrected by the spectral characteristic correcting unit 107 is transferred to the conversion coefficient calculating unit 108.

Based on a target spectral characteristic internally stored in advance and the corrected spectral characteristic of interest obtained from the spectral characteristic correcting unit 107, the conversion coefficient calculating unit 108 calculates a conversion coefficient for correcting a difference between the spectral characteristic of interest and the target spectral characteristic (a conversion coefficient for converting the spectral characteristic of interest to the target spectral characteristic). The conversion coefficient calculated by the conversion coefficient calculating unit 108 is transferred to the output unit 109.

The output unit 109 records and stores the conversion coefficient obtained from the conversion coefficient calculating unit 108 on a recording medium such as a memory card.

An exemplary configuration of the correction coefficient calculating unit 106 will be described below with reference to FIG. 5.

The correction coefficient calculating unit 106 includes a buffer 200, a signal calculating section 201, a correction function calculating section 202, and a reference signal ROM 203.

The signal processing unit 105 is connected to the buffer 200. The buffer 200 is connected to the signal calculating section 201. The signal calculating section 201 is connected to the correction function calculating section 202. The reference signal ROM 203 is also connected to the correction function calculating section 202. The correction function calculating section 202 is connected to the spectral characteristic correcting unit 107. The control unit 110 is bidirectionally connected to the signal calculating section 201 and the correction function calculating section 202 to control these sections.

An RGB signal is transferred from the signal processing unit 105 to the buffer 200, where the RGB signal is temporarily stored. The RGB signal stored in the buffer 200 is then transferred to the signal calculating section 201.

The signal calculating section 201 calculates an average RGB signal (an average R signal, an average G signal and an average B signal) for each color patch on the color chart 120 as depicted in FIGS. 2 and 3 from the RGB signal obtained through the buffer 200 (the average RGB signal is called basic RGB signal) and transfers the calculated basic RGB signal to the correction function calculating section 202.

The correction function calculating section 202 reads a reference RGB signal for each color patch which has been stored in the reference signal ROM 203 in advance. Here, the reference RGB signal is the sum of the products obtained for each wavelength component by multiplying a spectral characteristic of the light-box light source measured beforehand by a target spectral characteristic of the image pickup device (see FIG. 7), which represent targeted color reproduction, by a spectral transmittance of each color patch (see FIG. 3). Specifically, the RGB signal is calculated according to Expression 1.

$$R_i^T = \sum_{\lambda=400}^{700} T_\lambda^R \cdot L_\lambda \cdot O_\lambda^i$$ [Expression 1]

$$G_i^T = \sum_{\lambda=400}^{700} T_\lambda^G \cdot L_\lambda \cdot O_\lambda^i$$

$$B_i^T = \sum_{\lambda=400}^{700} T_\lambda^B \cdot L_\lambda \cdot O_\lambda^i$$

where $R_i^T$, $G_i^T$ and $B_i^T$ represent reference RGB signals, i represents the identification number of a color patch on the color chart 120, $T^R_\lambda$, $T^G_\lambda$, and $T^B_\lambda$ represent target spectral characteristics of R, G, and B pixels, respectively, which represent targeted color reproduction, $L_\lambda$, represents a spectral characteristic of the light source, and $O^i_\lambda$ represents the spectral transmittance of the color patch i.

Here, λ represents wavelength. The spectral characteristics given above are obtained by sampling in the range of wavelength of 400 nm to 700 nm at intervals of 10 nm. The identification number of a color patch of the color chart 120 can take a value in the range of 1 to n, where n is the total number of the color patches of the color chart 120. In the present embodiment, n is 11 as illustrated in FIGS. 2 and 3.

The reference RGB signals do not need to be limited to signals calculated according to Expression 1 described above. For example, an average RGB signal of each color patch of a color chart 120 photographed through particular one of multiple CCDs that belong to a given model may be used as the reference RGB signal.

Based on the read reference RGB signal and the basic RGB signal transferred from the signal calculating section 201, the correction function calculating section 202 calculates for example a coefficient of a correction matrix as a correction function used for correction for approximating the basic RGB signal to the reference RGB signal.

The correction matrix coefficient can be calculated by the method of least squares between the reference RGB signal and the basic RGB signal as expressed by Expression 2:

$$\min \sum_{i=1}^{n} |R_i^T - (a_1 \cdot R_i^S + a_2 \cdot G_i^S + a_3 \cdot B_i^S)|^2$$ [Expression 2]

$$\min \sum_{i=1}^{n} |G_i^T - (a_4 \cdot R_i^S + a_5 \cdot G_i^S + a_6 \cdot B_i^S)|^2$$

$$\min \sum_{i=1}^{n} |B_i^T - (a_7 \cdot R_i^S + a_8 \cdot G_i^S + a_9 \cdot B_i^S)|^2$$

where $R_i^S$, $Q_i^S$ and $B_i^S$ are basic RGB signals and $a_1$ to $a_9$ are correction matrix coefficients.

The correction matrix coefficients $a_1$ to $a_9$ thus calculated by the correction function calculating section 202 are transferred to the spectral characteristic correcting unit 107.

While the correction matrix coefficients calculated by Expression 2 are linear 3×3 matrix coefficients, nonlinear matrix coefficients that include high-order terms (nonlinear terms) of multiplication of $R_i^S$, $G_i^S$ and $B_i^S$. As with the calculation of linear matrix coefficients, nonlinear matrix coefficients can be calculated by the method of least squares. Specifically, nonlinear matrix coefficients can be calculated for example as illustrated by Expression 3:

$$\min \sum_{i=1}^{n} |R_i^T - [(b_{11} \cdot R_i^S + b_{12} \cdot G_i^S +$$ [Expression 3]

$$b_{13} \cdot B_i^S + b_{14} \cdot R_i^S \cdot G_i^S + b_{15} \cdot G_i^S \cdot B_i^S + b_{16} \cdot B_i^S \cdot R_i^S)|^2$$

$$\min \sum_{i=1}^{n} |G_i^T - (b_{21} \cdot R_i^S + b_{22} \cdot G_i^S +$$

$$b_{23} \cdot B_i^S + b_{24} \cdot R_i^S \cdot G_i^S + b_{25} \cdot G_i^S \cdot B_i^S + b_{26} \cdot B_i^S \cdot R_i^S)|^2$$

$$\min \sum_{i=1}^{n} |B_i^T - (b_{31} \cdot R_i^S + b_{32} \cdot G_i^S +$$

$$b_{33} \cdot B_i^S + b_{34} \cdot R_i^S \cdot G_i^S + b_{35} \cdot G_i^S \cdot B_i^S + b_{36} \cdot B_i^S \cdot R_i^S)|^2$$

where $b_{11}$ to $b_{36}$ represent coefficients of a nonlinear 3×6 matrix. In this way, $b_{11}$ to $b_{36}$ that provide minimum solutions of the three expressions given in Expression 3 can be calculated.

While coefficients of a nonlinear 3×6 matrix are calculated in Expression 3, coefficients of a nonlinear 3×9 matrix that further include the terms of squares of each of $R_i^S$, $G_i^S$ and $B_i^S$ can also be applied.

An exemplary configuration of the spectral characteristic correcting unit 107 will be described below with reference to FIG. 8.

The spectral characteristic correcting unit 107 includes a function correcting section 300.

The correction coefficient calculating unit 106 and the external interface unit 111 are connected to the function correcting section 300. The function correcting section 300 is connected to the conversion coefficient calculating unit 108. The control unit 110 is bidirectionally connected to the function correcting section 300 and controls the function correcting section 300.

The function correcting section 300 uses correction matrix coefficients $a_1$ to $a_9$ obtained from the correction coefficient calculating unit 106 to perform matrix conversion as illustrated by Expression 4 on spectral characteristics to be corrected $S^R_\lambda$, $S^G_\lambda$ and $S^B_\lambda$ inputted through the external interface unit 111.

$$\begin{pmatrix} S'^R_{\lambda=400} & \cdots & S'^R_{\lambda=700} \\ S'^G_{\lambda=400} & \cdots & S'^G_{\lambda=700} \\ S'^B_{\lambda=400} & \cdots & S'^B_{\lambda=700} \end{pmatrix} =$$ [Expression 4]

$$\begin{pmatrix} a_1 & a_2 & a_3 \\ a_4 & a_5 & a_6 \\ a_7 & a_8 & a_9 \end{pmatrix} \cdot \begin{pmatrix} S^R_{\lambda=400} & \cdots & S^R_{\lambda=700} \\ S^G_{\lambda=400} & \cdots & S^G_{\lambda=700} \\ S^B_{\lambda=400} & \cdots & S^B_{\lambda=700} \end{pmatrix}$$

where $S'^R_\lambda$, $S'^G_\lambda$ and $S'^B_\lambda$ are corrected spectral characteristics of interest.

The corrected spectral characteristics of interest are transferred from the function correcting section 300 to the conversion coefficient calculating unit 108.

Spectral characteristics of interest obtained by using the nonlinear matrix coefficients as illustrated by Expression 3 can be converted as illustrated in Expression 5, for example.

$$S_\lambda'^R = b_{11} \cdot S_\lambda^R + b_{12} \cdot S_\lambda^G + b_{13} \cdot S_\lambda^B + b_{14} \cdot S_\lambda^R \cdot S_\lambda^G + b_{15} \cdot S_\lambda^G \cdot S_\lambda^B + b_{16} \cdot S_\lambda^B \cdot S_\lambda^R$$

$$S_\lambda'^G = b_{21} \cdot S_\lambda^R + b_{22} \cdot S_\lambda^G + b_{23} \cdot S_\lambda^B + b_{24} \cdot S_\lambda^R \cdot S_\lambda^G + b_{25} \cdot S_\lambda^G \cdot S_\lambda^B + b_{26} \cdot S_\lambda^B \cdot S_\lambda^B$$

$$S_\lambda'^B = b_{31} \cdot S_\lambda^R + b_{32} \cdot S_\lambda^G + b_{33} \cdot S_\lambda^B + b_{34} \cdot S_\lambda^R \cdot S_\lambda^G + b_{35} \cdot S_\lambda^G \cdot S_\lambda^B + b_{36} \cdot S_\lambda^B \cdot S_\lambda^B \quad \text{[Expression 5]}$$

An exemplary configuration of the conversion coefficient calculating unit 108 will be described below with reference to FIG. 9.

The conversion coefficient calculating unit 108 includes a conversion function calculating section 400 and a spectral characteristic ROM 401 in which target spectral characteristics of the image pickup device which represent targeted color reproduction have been stored in advance.

The spectral characteristic correcting unit 107 is connected to the conversion function calculating section 400. The spectral characteristic ROM 401 is also connected to the conversion function calculating section 400. The conversion function calculating section 400 is connected to the output unit 109. The control unit 110 is bidirectionally connected to the conversion function calculating section 400 and controls the conversion function calculating section 400.

Based on corrected spectral characteristics of interest $S'^R_\lambda$, $S'^G_\lambda$ and $S'^B_\lambda$ inputted from the spectral characteristic correcting unit 107 and target spectral characteristics $T^R_\lambda$, $T^G_\lambda$ and $T^B_\lambda$, which represent targeted color reproduction, read from the spectral characteristic ROM 401, the conversion function calculating section 400 calculates conversion matrix coefficients $c_1$ to $c_9$ used for conversion for approximating the corrected spectral characteristics to the target spectral characteristics by the method of least squares as illustrated by Expression 6:

$$\min \sum_{\lambda=400}^{700} |T^R_\lambda - (c_1 \cdot S'^R_\lambda + c_2 \cdot S'^G_\lambda + c_3 \cdot S'^B_\lambda)|^2 \quad \text{[Expression 6]}$$

$$\min \sum_{\lambda=400}^{700} |T^G_\lambda - (c_4 \cdot S'^R_\lambda + c_5 \cdot S'^G_\lambda + c_6 \cdot S'^B_\lambda)|^2$$

$$\min \sum_{\lambda=400}^{700} |T^B_\lambda - (c_7 \cdot S'^R_\lambda + c_8 \cdot S'^G_\lambda + c_9 \cdot S'^B_\lambda)|^2$$

The conversion matrix coefficients $c_1$ to $c_9$ calculated by the conversion function calculating section 400 are transferred to the output unit 109.

While the conversion matrix coefficients calculated by Expression 6 are linear 3×3 matrix coefficients, nonlinear matrix coefficients that include high-order terms (nonlinear terms) of multiplication of $S'^R_\lambda$, $S'^G_\lambda$, $S'^B_\lambda$. As with the calculation of linear matrix coefficients, nonlinear matrix coefficients can be calculated by the method of least squares. Specifically, nonlinear matrix coefficients can be calculated for example as illustrated by Expression 7:

$$\min \sum_{\lambda=400}^{700} |T^R_\lambda - (d_{11} \cdot S'^R_\lambda + d_{12} \cdot S'^G_\lambda + \quad \text{[Expression 7]}$$

$$d_{13} \cdot S'^B_\lambda + d_{14} \cdot S'^R_\lambda \cdot S'^G_\lambda + d_{15} \cdot S'^G_\lambda \cdot S'^B_\lambda + d_{16} \cdot S'^B_\lambda \cdot S'^R_\lambda)|^2$$

-continued $$\min \sum_{\lambda=400}^{700} |T^G_\lambda - (d_{21} \cdot S'^R_\lambda + d_{22} \cdot S'^G_\lambda +$$

$$d_{23} \cdot S'^B_\lambda + d_{24} \cdot S'^R_\lambda \cdot S'^G_\lambda + d_{25} \cdot S'^G_\lambda \cdot S'^B_\lambda + d_{26} \cdot S'^B_\lambda \cdot S'^R_\lambda)|^2$$

$$\min \sum_{\lambda=400}^{700} |T^B_\lambda - (d_{31} \cdot S'^R_\lambda + d_{32} \cdot S'^G_\lambda +$$

$$d_{33} \cdot S'^B_\lambda + d_{34} \cdot S'^R_\lambda \cdot S'^G_\lambda + d_{35} \cdot S'^G_\lambda \cdot S'^B_\lambda + d_{36} \cdot S'^B_\lambda \cdot S'^R_\lambda)|^2$$

where $d_{11}$ to $d_{36}$ represent coefficients of a nonlinear 3×6 matrix. In this way, $d_{11}$ to $d_{36}$ that provide the minimum solutions of the three expressions given in Expression 3 can be calculated.

While a CCD has been taken as an example of the image pickup device, the image pickup device may be a CMOS image pickup device or other type of image pickup device, of course.

While a single-CCD image pickup device equipped with a Bayer primary color filter is used in the foregoing, it is not limited thereto. A single-CCD image pickup device equipped with a complementary color filter may be used. Any image pickup device equipped with a color filter having any multiple independent color components, whether a primary or complementary color filter, may be used.

In addition, the image pickup device is not limited to a single-CCD. The image pickup device may be a two-CCD, three-CCD, or any other multi-CCD image pickup device.

While the transmissive color chart 120 is used in the foregoing, the color chart 120 is not limited thereto. For example, a reflective color chart can be used. In that case, a different external lighting apparatus, instead of light-box light source, is used to apply illuminating light to the color chart.

A circular rotary filter 130 (the filters have spectral characteristics as represented by $O^1$ to $O^{11}$ in FIG. 11) may be provided in front of the lens system 100. The rotary filter 130 can be rotated to obtain a video signal of each color patch.

In addition, a light-emitting color chart which emits light in any narrow wavelength band may be used.

While it is assumed that the processing described above is performed by hardware, the present invention is not limited to such a configuration. For example, an unprocessed video signal from the CCD 101 may be inputted into a computer as raw data and a spectral characteristic correction program, which is separate software, may be executed by the computer to accomplish the processing.

Referring to FIG. 11, a flow of process by the spectral characteristic correction program will be described.

When the process is started, first an unprocessed video signal, spectral characteristics of interest of an image pickup device which are to be corrected, target spectral characteristics of the image pickup device which represent targeted color representation, spectral characteristics of a light source, and spectral characteristics of a color chart are inputted (step S1).

Then, interpolation processing is applied to a video signal obtained at step S1 to generate a three video signal including all of color component signals for each pixel (step S2).

Then, an average RGB signal of each color patch of the color chart 120 is calculated from the video signal obtained at step S2 (step S3). The average RGB signal calculated here is called basic RGB signal.

Based on the target spectral characteristics of image pickup device that represent targeted color reproduction, the spectral characteristics of the light source, and the spectral characteristics of the color chart, a reference RGB signal is calculated as illustrated by Expression 1, for example (step S4).

The luminance of the basic RGB signal is corrected so as to match the luminance of the reference RGB signal (step S5).

Then, based on the basic RGB signal obtained at step S5 and the reference RGB signal, correction coefficients are calculated as illustrated by Expression 2 (or Expression 3), for example (step S6).

Then, based on the correction coefficients obtained at step S6, the spectral characteristics of interest are corrected as illustrated by Expression 4 (or Expression 5) (step S7).

Based on the corrected spectral characteristics of interest and the target spectral characteristics, conversion coefficients are calculated as illustrated by Expression 6 (or Expression 7) (step S8), then the process will end.

While the spectral characteristic correction apparatus and the spectral characteristic correction program have been described above, the spectral characteristic correction program may be recorded on a recording medium or a spectral characteristic correction method that performs the same processing may be used.

According to the first embodiment described above, spectral characteristics can be readily corrected since a video signal obtained by photographing a color chart is used to first correct spectral characteristics, then conversion coefficients are calculated on the basis of the corrected spectral characteristics and target spectral characteristics that represent targeted color reproduction.

Furthermore, by correcting the spectral characteristics, a difference in color reproduction between two image pickup devices having different spectral characteristics can be minimized.

Moreover, the calculated conversion coefficients can be used as coefficients for color conversion processing of image pickup apparatuses such as digital cameras and video cameras to achieve highly precise color conversion.

The present invention is not limited to the embodiments described above. The present invention can be embodied by modifying any of components thereof in a practical phase without departing from the spirit of the present invention. By combining components disclosed in the above-described embodiments as appropriate, various implementations of the invention can be made. For example, some of the components given in the embodiments may be omitted. Furthermore, components in different embodiments may be combined as appropriate. It will be understood that various modifications and applications are possible without departing from the spirit of the present invention.

What is claimed is:

1. A spectral characteristic correction apparatus which corrects a spectral characteristic characterizing a color signal including a plurality of chrominance signals, the apparatus comprising:
    a correction coefficient calculating unit for calculating, based on basic color signals obtained by photographing a color chart including a plurality of color patches using a first image pickup device and reference color signals stored in advance which correspond to the basic color signals, a correction coefficient for performing correction for approximating one of the basic color signals and the reference color signals to the other of the basic color signals and the reference color signals;
    a spectral characteristic correcting unit for correcting a spectral characteristic of interest to be corrected by using the correction coefficient calculated by the correction coefficient calculating unit; and
    a conversion coefficient calculating unit for calculating, based on the spectral characteristic of interest corrected by the spectral characteristic correcting unit and a target spectral characteristic of a second image pickup device which represents a targeted color reproduction, a conversion coefficient for performing conversion for approximating the corrected spectral characteristic of interest to the target spectral characteristic.

2. The spectral characteristic correction apparatus according to claim 1, wherein the correction coefficient calculating unit comprises a signal calculating unit for calculating a color signal of each of the color patches as the basic color signal from a color signal obtained by the first image pickup device.

3. The spectral characteristic correction apparatus according to claim 2, wherein the correction coefficient calculating unit further comprises a correction function calculating unit for calculating, based on each of the chrominance signals of the basic color signal and each of the chrominance signals of the reference color signal, a coefficient of a correction function for performing correction for approximating each of the chrominance signals of the basic color signal to each of the chrominance signals of the reference color signal.

4. The spectral characteristic correction apparatus according to claim 3, wherein the spectral characteristic correcting unit comprises a function correcting unit for correcting the spectral characteristic of interest to be corrected by using the correction function.

5. The spectral characteristic correction apparatus according to claim 1, wherein the conversion coefficient calculating unit comprises a conversion function calculating unit for calculating, based on the spectral characteristic corrected by the spectral characteristic correcting unit and the target spectral characteristic, a coefficient of a conversion function for performing conversion for approximating the corrected spectral characteristic to the target spectral characteristic.

6. The spectral characteristic correction apparatus according to claim 1, wherein the color patches transmit, reflect or emit light in a particular narrow wavelength band.

7. A spectral characteristic correction method for correcting a spectral characteristic characterizing a color signal including a plurality of chrominance signals, the method comprising:
    calculating, based on basic color signals obtained by photographing a color chart including a plurality of color patches using a first image pickup device and reference color signals stored in advance which correspond to the basic color signals, a correction coefficient for performing correction for approximating one of the basic color signals and the reference color signals to the other of the basic color signals and the reference color signals;
    correcting a spectral characteristic of interest to be corrected by using the calculated correction coefficient; and
    calculating, based on the corrected spectral characteristic of interest and a target spectral characteristic of a second image pickup device which represents a targeted color reproduction, a conversion coefficient for performing conversion for approximating the corrected spectral characteristic of interest to the target spectral characteristic.

8. The spectral characteristic correction method according to claim 7, wherein calculating the correction coefficient comprises calculating a color signal of each of the color patches as the basic color signal from a color signal obtained by the first image pickup device.

9. The spectral characteristic correction method according to claim 8, wherein calculating the correction coefficient further comprises calculating, based on each of the chrominance signals of the basic color signal and each of the chrominance signals of the reference color signal, a coefficient of a correction function for performing correction for approximating each of the chrominance signals of the basic color signal to each of the chrominance signals of the reference color signal.

10. The spectral characteristic correction method according to claim 9, wherein correcting the spectral characteristic comprises correcting the spectral characteristic of interest to be corrected by using the correction function.

11. The spectral characteristic correction method according to claim 7, wherein calculating the conversion coefficient comprises calculating, based on the corrected spectral characteristic and the target spectral characteristic, a coefficient of a conversion function for performing conversion for approximating the corrected spectral characteristic to the target spectral characteristic.

12. A recording device on which a spectral characteristic correction program is stored for controlling a computer to correct a spectral characteristic characterizing a color signal including a plurality of chrominance signals, the program being executable to control the computer to perform functions comprising:

calculating, based on basic color signals obtained by photographing a color chart including a plurality of color patches using a first image pickup device and reference color signals stored in advance which correspond to the basic color signals, a correction coefficient for performing correction for approximating one of the basic color signals and the reference color signals to the other of the basic color signals and the reference color signals;

correcting a spectral characteristic of interest to be corrected by using the calculated correction coefficient; and calculating, based on the corrected spectral characteristic of interest and a target spectral characteristic of a second image pickup device which represents a targeted color reproduction, a conversion coefficient for performing conversion for approximating the corrected spectral characteristic of interest to the target spectral characteristic.

* * * * *